March 1, 1932. H. O. POLLEI 1,847,361

METHOD OF WELDING TUBULAR CONNECTIONS TO PRESSURE VESSELS

Filed May 14, 1930

INVENTOR.
Harold O. Pollei
BY
ATTORNEY.

Patented Mar. 1, 1932

1,847,361

UNITED STATES PATENT OFFICE

HAROLD O. POLLEI, OF MILWAUKEE, WISCONSIN, ASSIGNOR TO A. O. SMITH CORPORATION, OF MILWAUKEE, WISCONSIN, A CORPORATION OF NEW YORK

METHOD OF WELDING TUBULAR CONNECTIONS TO PRESSURE VESSELS

Application filed May 14, 1930. Serial No. 452,318.

This invention relates to a method of welding tubular connections to pressure vessels and the like.

An object of the present invention is to provide a method of welding manways to pressure vessels which is less expensive and more rapid and economical.

A more specific object of the invention is to provide a method of forming manways to be welded to the walls of pressure vessels, prior to the final welding operation.

A further object of the invention is to provide a method of welding manways to pressure vessels which eliminates stresses in the finished weld.

The invention resides in welding a ring of less thickness than the wall of the manway, to the end of the manway to form a relatively thin lip at the end thereof.

The invention will be best understood by reference to the accompanying drawings, in which.

Figure 1:
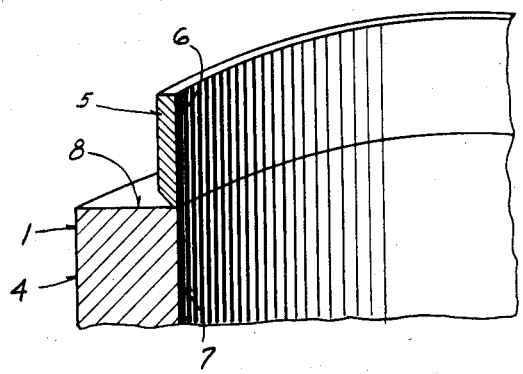
Figure 1 is a sectional view of the manway and ring in position for the first step in the welding operation.
Figure 2:
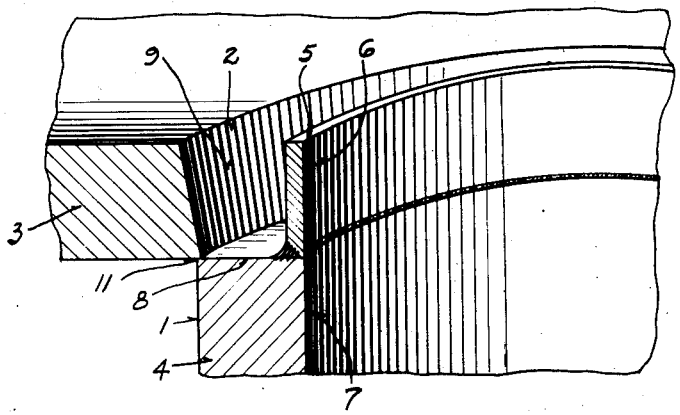
Fig. 2 is a longitudinal sectional view of the manway and pressure vessel in position for final welding operations.
Figure 3:
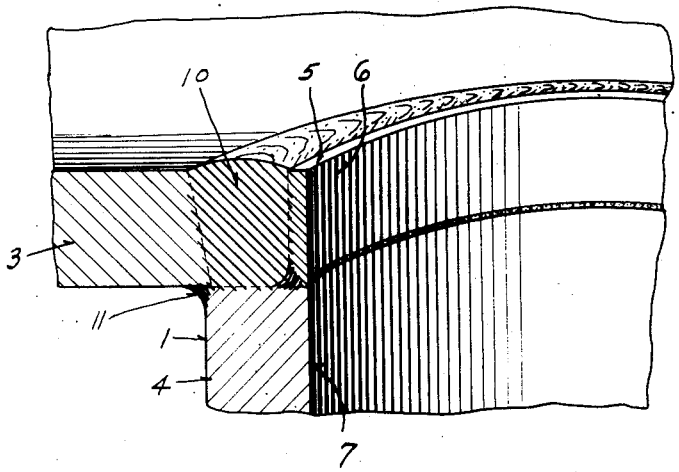
Fig. 3 is a similar view showing the manway welded to a wall of the pressure vessel.

Tubular connections for pressure vessels may be forged, cast, or fabricated from flat sheets of thick metal which are welded or riveted together.

In order to relieve stresses caused by welding the thick tubular connection to the vessel wall, it has been found desirable to produce a thin lip on the tubular connection at the end to be welded, thereby forming a groove between the lip and the wall of the pressure vessel. The groove is filled with molten weld metal, preferably by means of an electric arc which is established between a fusible metallic weldrod and the metal at the base of the groove. When the weld metal contracts upon cooling, the thin lip bends and neutralizes the stresses in the deposited metal and in the parts adjacent to the weld.

It is in the production of such a manway with a thin lip that this invention is concerned. The practice heretofore employed is to forge or fabricate the manway and to produce the lip by chamfering the end to be welded until it has been reduced in thickness sufficiently to produce the desired results.

The present invention provides a method of welding manways to pressure vessels which eliminates chamfering of the end of the manway to be welded.

A blank of the desired size is forged, fabricated, or otherwise shaped to form a tubular member or manway 1. The diameter of the manway 1 may be slightly greater than that of the opening 2 in the wall 3 of the pressure vessel, in order that the wall 3 may support the manway during the welding operation, or the manway may be centered in the opening and tacked in place.

The walls 4 of the manway 1 are formed of thick metal, in order that the strength thereof may equal that of the vessel proper. A relatively thin strip of metal, having a width substantially equal to the thickness of the wall 3 of the pressure vessel, is rolled into a ring 5 and the abutting ends joined, preferably by welding. The inner surface 6 of the ring 5 is made to fit substantially flush with the inner surface 7 of the wall 4 of the manway 1.

The ring 5 is held in axial alignment with the end 8 of the manway 1 by means of tack welds or clamps. The ring is then welded to the manway 1 preferably by means of an electric arc which is passed along the circumferential seam.

The manway 1 thereby has a thin, integral lip 5 which serves to reduce stresses in the same manner as one which is chamfered. The operation of forming the lip 5 by the present method is performed in a shorter time and at a much lower cost than by chamfering.

The projecting lip 5 is inserted into the opening 2 in the wall 3 of the pressure vessel, forming a welding groove 9 between the lip 5 and the wall 3. The groove 9 is then filled with molten weld metal 10, preferably by means of an electric arc established between the work and a fusible metallic weldrod and which progressively fuses the parts together. After the welding groove 9 is partly filled, an arc is passed around the seam 11 at the outer intersection of the manway 1 and the wall of the vessel 3. This fuses the metal of the parts to be joined at a point at which much of the strain comes, and prevents cracks in the weld metal.

Thereafter the groove 9 is completely filled and the weld finished. Various reenforcements may be applied to the outer intersection 11, in the form of collars, and the like, welded to both the manway and the metal wall.

This method of joining tubular connections may be applied as well to joining tubular members to flat plates.

I claim:

1. A method of welding tubular connections to thick metal plates which comprises providing a tubular connection, welding a ring to one end of said tubular connection and in axial alignment therewith, said ring being of lesser thickness than the tubular connection and having an inside diameter substantially equal to that of the tubular connection and an outside diameter less than that of the tubular connection, inserting said end into an opening in a thick metal plate, and integrally uniting the ring, tubular connection and thick metal plate by means of an electric arc.

2. A method of welding tubular connections to thick walled pressure vessels which comprises providing a manway and a relatively thin metal ring having an inside diameter substantially equal to that of the manway, placing the ring in an abutting relation with one end of the manway and in axial alignment therewith, thereafter welding the ring to the manway in such relation to form a thin lip at the end thereof, inserting the end of the manway into an opening in the vessel wall and concentric with said opening, and welding the ring and manway to the vessel wall by means of an electric arc.

3. The method of welding manways to pressure vessels which comprises forming a manway having walls of substantial thickness, forming a ring of relatively lesser thickness and having an inside diameter substantially equal to that of the manway, placing the ring in abutting relation to the manway and in axial alignment therewith, welding the ring to the manway, thereafter inserting the ring of the manway into an opening in the vessel wall, and welding the manway to the vessel wall by depositing welding metal between the ring and the wall of the vessel.

4. The method of welding manways to pressure vessels which comprises forming a manway having walls of substantial thickness, forming a ring of relatively lesser thickness and having an inside diameter substantially equal to that of the manway, placing the ring in abutting relation to the manway and in axial alignment therewith, welding the ring to one end of the manway, inserting said end of the manway into an opening in the vessel wall, thereby forming a groove between the ring and the vessel wall, and thereafter filling the groove with molten weld metal to weld the manway to the vessel wall.

5. The method of welding manways to pressure vessels which comprises forming a manway and welding a relatively thin ring of lesser diameter than the outside diameter of said manway to one end thereof and coaxial therewith to form a thin circumferential lip on said manway, inserting the lip into an opening in the wall of a pressure vessel, and welding the lip and manway to the vessel wall.

6. The method of welding manways to pressure vessels which comprises forming a manway and welding a relatively thin ring of lesser diameter than the outside diameter of said manway to one end thereof coaxial therewith to form a thin circumferential lip on said manway, inserting the manway into an opening in the wall of a pressure vessel and concentric with the opening, thereby forming a welding groove between the ring and the vessel wall, and thereafter filling the groove with molten weld metal.

7. The method of welding manways to pressure vessels which comprises forming a manway and welding a relatively thin ring of lesser diameter than the outside diameter of said manway to one end thereof and coaxial therewith to form a thin circumferential lip on said manway, inserting the manway into an opening in the wall of a pressure vessel concentric with the opening, thereby forming a welding groove between the ring and the vessel wall, partially filling the groove, welding the seam at the intersection of the manway and the outer wall of the vessel, and thereafter completely filling the groove.

8. The method of welding tubular connectors to a thick metal plate in alignment with an opening which comprises erecting a welding dam on the connector, inserting the welding dam into the opening to associate it with the wall of the thick metal plate defining the opening to provide a welding groove and depositing weld metal in the groove to unite the connector, and plate.

9. The method of welding manways to thick walled pressure vessels which comprises providing a tubular manway, providing a thin ring having an inside diameter approximating that of the manway, applying said ring to one end of the manway in axial alignment therewith, inserting the ring and manway into an opening in the vessel wall, and welding said ring, manway and vessel wall into an integral structure.

10. The method of welding tubular connectors to a thick metal plate in alignment with an opening which comprises applying independent means to the end of the connector to form a circumferential welding dam, inserting said dam into the opening to associate it with the wall of the thick metal plate defining the opening to provide a welding groove, and depositing weld metal in the groove to unite the connector and plate.

In witness whereof I have hereunto subscribed my name at Milwaukee, Wisconsin, this 5th day of May, 1930.

HAROLD O. POLLEI.